April 27, 1965   R. FILLION   3,180,622
TOWING AND HOISTING CRANE FOR FISHING VESSELS
Filed Feb. 13, 1962   2 Sheets-Sheet 1

INVENTOR
Roméo FILLION
BY
ATTORNEYS

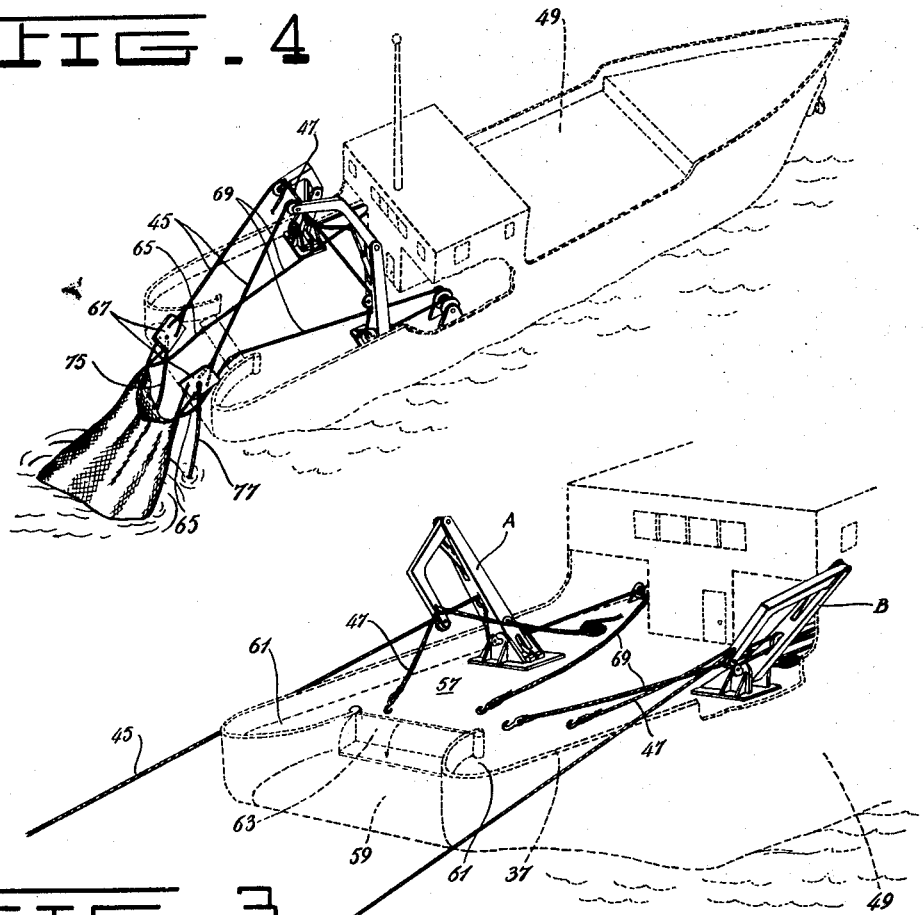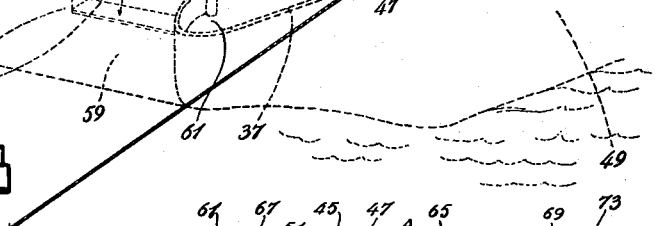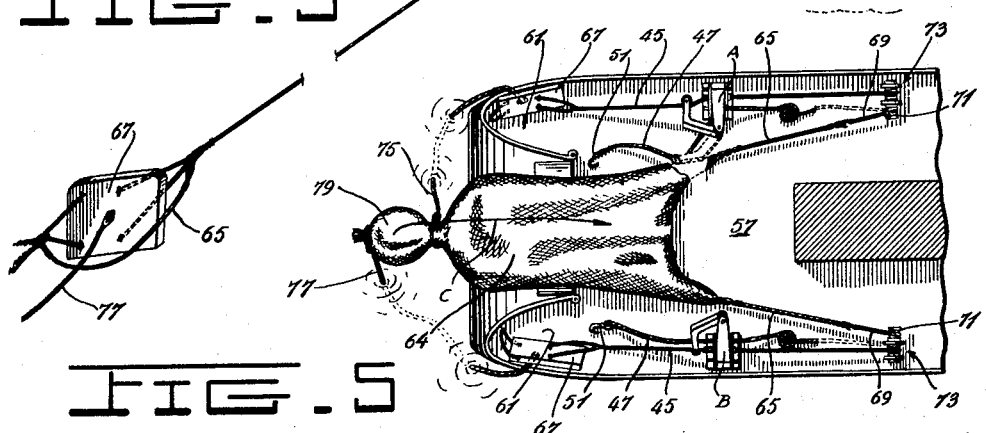

3,180,622
Patented Apr. 27, 1965

3,180,622
TOWING AND HOISTING CRANE FOR FISHING VESSELS
Romeo Fillion, Quebec, Quebec, Canada, assignor to Chantier Maritime de St.-Laurent (Quebec) Inc.-St. Lawrence Shipyards (Quebec) Inc., St. Laurent, Montmorency, Quebec, Canada
Filed Feb. 13, 1962, Ser. No. 173,029
4 Claims. (Cl. 254—137)

The present invention relates to a hoisting crane of particular use for hauling and hoisting a fishing net or the like equipment and bringing it on the deck of a fishing vessel.

In present day practice, particularly in bottom fishing, the dragging of the net along the bottom of the sea is carried out from the side of the fishing vessel and the towing wires are connected and wound on a winch located on the upper deck. When the net is full, it is drawn close to the side of the vessel but it cannot be lifted directly onto the deck because of the low location of the winch and a high boom with proper training equipment must be used in order to get the net over the railing. However such a high boom cannot be used for dragging because the lever arm created would be too great and would probably cause the ship to lean over dangerously and even capsize. Such a boom is only used for hoisting once the net gets close enough to the side of the vessel. Also, in such bottom fishing, trawl doors are used with the trawling gear, which slide standing on edge along the bottom while set out at an angle to the direction of the tow so as to open the wings of the net outwardly during the towing operation. These doors are of large sizes and can cause great harm or even fatal injury to a fisherman when the latter attempts to hook a hoisting line to the net as is necessary to bring the latter over the railing and on the deck. This is because in such cases, the fisherman is often caught between the heavy doors and the side railing and, particularly in heavy seas, this operation may be quite dangerous.

Furthermore, the present operation of hoisting a fishing net on the deck to empty it requires the continuous presence of two or three men and is not very efficient while being also dangerous, as stated above.

It is, therefore, a main object of the invention to provide a hoisting crane which will permit the usual dragging of the net along the bottom of the sea as well as the hoisting thereof over the ship's railing and onto the deck without the continuous use of any extra labour: one man being able to carry out the whole operation.

Another object of the invention lies in the provision of a dragging and hoisting crane which will completely eliminate the dangerous operation described above of hooking a hoisting line to the fishing net for raising it over the railing and for emptying it.

A still further object of the invention resides in the provision of a dragging and hoisting crane of simple manufacture which will not substantially increase the material cost of present day fishing equipment of that nature and which can easily, rapidly and cheaply be serviced.

Finally, the invention also has for an object the provision of a dragging and hoisting crane of the above said type which can be operated by a single man.

The above and further advantages of the invention will become apparent as the following description of a specific embodiment proceeds having regard to the accompanying drawings wherein.

FIGURES 3, 4 and 5 all illustrate the crane of the invention in actual operation: FIGURE 3 showing the crane used as a dragging device; FIGURE 4 showing the crane as a hoisting device when the fishing net approaches the stern of the fishing vessel and FIGURE 5 illustrates the crane of the invention in inoperative position.

Figure 1:
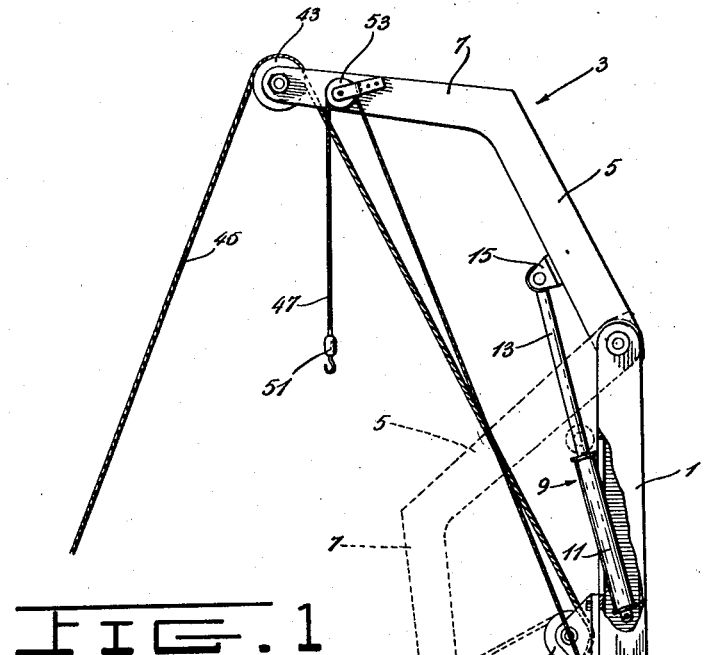
FIGURE 1 is a side elevation view, partly cut away to show some of the internal structure, of a dragging and hoisting crane of the invention.
Figure 2:
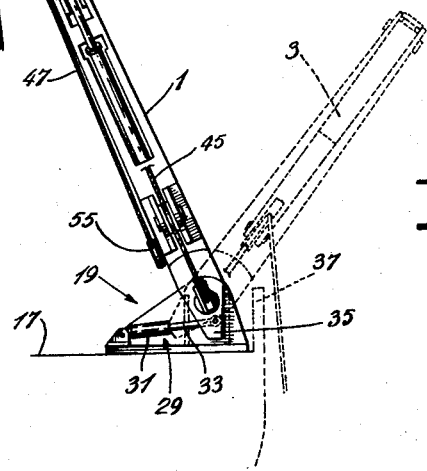
FIGURE 2 is a front elevation view of the crane of the invention.

FIGURES 1 and 2 completely illustrate the invention. It is shown to consist of a first or lower boom 1 pivotally connected, in any known manner, at one end to a second or upper boom 3. The latter is itself formed of two angularly disposed portions 5 and 7. The pivoting action of the first and second booms can be obtained by means of any conventional devices such as the hydraulic system 9, the cylinder part 11 of which has one end connected to the lower boom 1 and the rod part 13 has the free end thereof pivoted to the lower portion 5 through a bracket 15.

The lower boom 1 is fixed to the deck 17 by being pivotally joined to a base 19 formed of a base plate 21 and two outstanding spaced parallel cheeks 23. Angular stiffeners 25 may be used to insure rigidity to the base structure.

The lower boom 1 may be pivotally connected to the base plate by means of a pipe 27 secured to and extending across the two cheek plates 23. The use of a pipe may be convenient in that it can also serve as a guide for the hoisting wires as shown in FIGURE 1.

Pivoting action of the lower boom 1 may be obtained in any conventional manner and the one shown consists in the use of another hydraulic piston 29, the cylinder 31 of which has one end pivotally connected to base plate 21 while the rod 33 thereof has the free end joined to a portion 35 of the lower boom which extends on the other side of the pivot axis.

One of the main features of the invention as clearly illustrated in FIGURES 1 and 2 is that the pivot axis of the lower boom 1, which axis is usually parallel to the side railing 37 of the ship, is normal to the pivot axis of the upper boom 3.

Therefore, as shown in dotted lines in FIGURES 1 and 2, upper boom 3 may move up and down in a plane which is normal to the plane in which the lower boom 1 may move.

Hoisting wire guide means is provided on both the lower boom 1 and the upper boom 3. In the case of the former the wire guide means consist of two vertically disposed pulleys 39 and 41 rotatable on parallel axes while a further pulley 43, also rotatable on an axis parallel to the axis of pulleys 39 and 41, is provided at the free end of the upper boom 3.

In operation, a towing and hoisting wire 45 is trained first around the upper boom pulley 43 and then successively around the lower boom pulleys 39 and 41. From pulley 41 wire 45 is drawn through the previously mentioned pivot pipe 27 whence it is directed to the hoisting winch.

FIGURES 1 and 2 illustrate that in dragging or towing position, the upper boom 3 is pivoted downwardly and wire 45 is freed from pulley 43. In hoisting position, this upper boom is raised, as shown in full line, so as to permit the raising of the fishing net above the water and over the railing.

A further auxiliary lifting line 47 equipped with a hook 51 may be used for a purpose to be explained later. Line 47 winds around pulleys 53 and 55 located at the outer end of upper boom 3 and the lower end of lower boom 1 respectively. From lower pulley 55, line 47 is directed to a hoisting winch.

The operation of the dragging and hoisting crane will best be understood by reference to FIGURES 3, 4 and 5 wherein 49 is a fishing schooner having a stern deck 57 on which are mounted two cranes made according to the invention.

Although this is not necessary, in modern ships, the stern deck is terminated by an arrangement especially adapted for hoisting and embarking the fishing net on the stern deck. This arrangement comprises a sloping arcuate ramp 59 borded by the side railings 37 which are arcuately bent inwardly to form protected areas 61 made for a purpose to be determined later. The inner end of the sloping part may be closed by a pivotable door 63.

FIGURE 3 shows a fishing net 64 being drawn in toward the boat by the towing wires 45 connected to two cranes A and B mounted on either side of the stern deck 57. Cranes A and B are pivoted outwardly so that wires 45 lie along each side of the vessel. As the fishing net 64 approaches the stern end of the vessel, the lower booms 1 of cranes A and B are pivoted inwardly while at the same time the upper booms 5 are raised so that wires 45 are drawn inwardly in the sloping part 59 and raised to permit the fishing net 65 to be drawn out of water as best illustrated in FIGURE 4. In the position just prior to that of FIGURE 4, the connecting line 65 which freely jumps across each trawl door 67 is disconnected at the forward end and joined to a drag line 69 which is independent of cranes A and B and winds around the niggerhead 71 of winch 73. At that moment, the hoisting wire 45 and trawl doors 67 may be disconnected completely from the fishing net 64 and put aside as illustrated in FIGURE 5. This operation of switching from the hoisting wire 45 to the drag line 69 to bring the fishing net 65 aboard the ship may conveniently be carried out by fisherman standing in the protected areas 61.

As is known in the trade, to empty the net a pocket 79 of fish is formed by means of two cables 75 and 77 which are permanently attached to the rear end of fishing net 64 and to each of a trawl door. The rearward cable 77 has a hangman's noose at the end which is normally tightened whereas cable 75 has also a hangman's noose which, however, is normally loose. The latter when the net has reached the position of FIGURE 5 is tightened to form a pocket and, thereafter, one of the fishermen standing in the protected areas 61 grabs a hook 51 at the end of the previously mentioned fishing line 47 and then hooks on this pocket 79 which is then brought inward as indicated by arrow C. Once over the stern deck 57, the noose at the end of cable 77 is loosened to let the fish caught in pocket 79 fall on the deck. Once the pocket is empty, the noose is again closed and the one at the end of cable 75 loosened and the pocket is pushed back so that more fishes from the forward part of the net 64 fall to form another pocket 79. The operation is thereafter repeated until all the fishes in the net have been taken out.

Having thus described a specific embodiment of the invention, the scope thereof is now set forth in the appended claims.

I claim:

1. In a dragging and hoisting device, the combination comprising:
   (a) a base adapted to be mounted on a substantially horizontal supporting surface;
   (b) a first boom;
   (c) means mounting one end of said first boom on said base, for pivotal movement in a plane substantially normal to said base;
   (d) a second boom;
   (e) means mounting one end of said second boom to the free end of said first boom for pivotal movement of said second boom about a first axis lying in said normal plane and perpendicular to the longitudinal axis of said first boom;
   (f) a first pulley at the free end of said second boom rotatable about an axis parallel to said first axis;
   (g) a second pulley on said first boom also rotatable about an axis parallel to said first axis;
   (h) a dragging and hoisting cable successively trained around said first and second pulley;
   (i) power means interconnecting said booms for moving said second boom vertically in relation to said first boom from a position where said first pulley engages said cable to a second position where it is free therefrom and said cable only engages said second pulley.

2. A device as claimed in claim 1 wherein said first boom is provided with a third pulley rotatable about an axis parallel to the axes of the other pulleys and disposed below the second pulley; a tube through said base and first boom and about which said first boom pivots; said tube being axially tangential to said third pulley whereby the cable may be pulled through said tube after being trained around said third pulley.

3. A device as claimed in claim 1 wherein the second boom bends outwardly towards the load adapted to be dragged and hoisted.

4. A dragging and hoisting crane for a fishing vessel having a substantially horizontal stern deck and a lateral railing, comprising:
   (a) a base adapted to be mounted on said deck;
   (b) a first boom;
   (c) means mounting one end of said first boom on said base for pivotal movement in a substantially vertical plane toward and away from said railing;
   (d) a second boom;
   (e) means mounting one end of said second boom to the free end of said first boom for pivoting movement of said second boom about a first axis lying in said normal plane and perpendicular to the longitudinal axis of said first boom, whereby said second boom may be made to move in the direction of the stern of the vessel and across said railing;
   (f) a first pulley at the free end of said second boom rotatable about an axis parallel to said first axis;
   (g) a second pulley on said first boom also rotatable about an axis parallel to said first axis;
   (h) a dragging and hoisting cable successively trained around said first and second pulley;
   (i) power means interconnecting said boom for pivoting said second boom about said first axis from a position where said first pulley engages said cable to a second position where it is free therefrom and said cable only engages said second pulley.

References Cited by the Examiner
UNITED STATES PATENTS

| 198,506 | 12/77 | Carlile | 254—139.1 |
| 1,737,753 | 12/29 | Tarnham. | |
| 2,389,872 | 11/45 | Ruger et al. | |
| 2,517,813 | 8/50 | Wallace. | |
| 2,577,338 | 12/51 | Leach. | |
| 2,828,867 | 4/58 | Frisk. | |
| 2,883,068 | 4/59 | McIntyre | 254—161 X |
| 2,951,596 | 9/60 | Winder et al. | 254—134.3 X |
| 2,961,102 | 11/60 | Pitman | 212—35 |
| 3,006,097 | 10/61 | Luketa | 43—8 |

FOREIGN PATENTS 158,686   2/33   Switzerland.

ERNEST A. FALLER, Primary Examiner.

JOSEPH P. STRIZAK, SAMUEL F. COLEMAN, Examiners.